United States Patent [19]

Rhodes et al.

[11] 3,857,408

[45] Dec. 31, 1974

[54] SEAT AND SEALING MEANS FOR CLAPPER-TYPE CHECK VALVE

[75] Inventors: Allen F. Rhodes, Riverside, Conn.; Ruben G. Alaniz, Houston, Tex.

[73] Assignee: ACF Industries, Incorporated, New York, N.Y.

[22] Filed: Oct. 23, 1973

[21] Appl. No.: 408,979

[52] U.S. Cl. .............................. 137/514, 137/527
[51] Int. Cl. ........................................ F16k 15/03
[58] Field of Search ................ 137/514, 527, 527.8; 251/50, 172, 173, 298, 299, 303

[56] References Cited
UNITED STATES PATENTS

| | | | |
|---|---|---|---|
| 2,578,590 | 12/1951 | Perrault | 137/527.8 X |
| 2,717,001 | 9/1955 | Perrault | 137/514 |
| 2,868,497 | 1/1959 | Graham | 251/172 |
| 3,191,619 | 6/1965 | Allen | 137/527 X |

*Primary Examiner*—Robert G. Nilson
*Attorney, Agent, or Firm*—Eugene N. Riddle

[57] ABSTRACT

Seat and sealing means for a clapper-type check valve in which a movable seat ring for the clapper is hydraulically cushioned upon contact of the clapper with the seat ring. A fluid chamber cushions the movement of the seat ring and contains flowline fluid which is squeezed or metered from the chamber upon impact of the clapper with the seat. A sealing member on the seat ring extends into the fluid chamber but is inoperative when the valve member is out of contact with the seat ring to permit a continuous flow of flowline fluid through the chamber in the open position of the valve member. Sealing of the seat ring is effective only upon travel of the seat ring after contact by the valve member and a free lip portion on the sealing member provides a sealing pressure proportional to the flowline pressure.

7 Claims, 4 Drawing Figures

3,857,408

PATENTED DEC 31 1974

3,857,408

SEAT AND SEALING MEANS FOR CLAPPER-TYPE CHECK VALVE

BACKGROUND OF THE INVENTION

Heretofore, clapper-type check valves have been cushioned in order to minimize any chattering or shock resulting from a slamming of the valve which might tend to distort or rupture the valve structure. For example, U.S. Pat. No. 2,578,590 dated Dec. 11, 1951 shows a clapper-type check valve which is hydraulically cushioned to minimize shock from a slamming of the valve. However, no effective sealing is shown for the seat of the clapper-type valve member shown in U.S. Pat. No. 2,578,590 and in the closed position fluid would possibly leak past the check valve member especially when exposed to a high pressure as only metal to metal contact is provided on the seat.

U.S. Pat. No. 3,191,619 dated June 29, 1965 illustrates a swing-type check valve in which a wave spring is provided behind a movable seat ring to provide cushioning upon contact of the check valve member with the seat ring. An annular sealing member about the circumference of the seat ring moves with the seat ring upon contact with the valve member and provides a seal at all times. In the event foreign matter from the flowline fluid, such as sand or the like, collects in the chamber for the wave spring such foreign matter would be difficult to remove as no flushing action of the flowline fluid through the chamber is provided since the sealing member effects a seal at all times.

Thus, the prior art does not illustrate a clapper-type swing check valve structure having a hydraulically cushioned movable seat member with the fluid chamber providing the cushioning having a continuous flow of flowline fluid therethrough when the valve member is out of contact with the seat member, and a sealing member for the seat member effective only upon a travel of the seat member after contact by the valve member.

DESCRIPTION OF THE INVENTION

The present swing-type clapper-type check valve is particularly adapted for use in pipelines. Pipelines must be capable of receiving objects such as "pigs" which are passed through pipelines for cleaning purposes. Therefore, check valves in pipelines are normally full opening valves so that the clapper valve member is removed from the flow passage, and any seating assemblies have an inner circumference in axial alignment with the perimeter of the flow passage so that a full bore is provided.

The present invention is directed to seat and sealing means for a clapper-type check valve structure having a movable seat ring which is hydraulically cushioned by metering of fluid from a fluid chamber upon contact of the clapper with the seat ring thereby to minimize chattering or shock from a slamming of the valve member. The seat ring has outer and intermediate peripheral surfaces which are received within complementary outer and intermediate peripheral surfaces formed by the recessed end of the fluid conduit on which the seat ring is mounted for movement, and suitable clearances are provided between such complementary surfaces to permit a limited fluid flow. The complementary intermediate and outer peripheral surfaces of the seat ring and recessed conduit are connected by opposed annular ledges spaced from each other to form the fluid chamber therebetween which cushions the movement of the seat ring to a retracted position when the seat ring is contacted by the valve member. When the seat ring is in an extended position with the valve member out of contact therewith, flowline fluid flows through the clearance between the complementary intermediate peripheral surfaces, next through the fluid chamber, and thence through the clearance between the complementary outer peripheral surfaces back into the flowline to provide a flushing action or continuous movement of flowline fluid through the fluid chamber thereby to remove foreign matter such as sand or pipeline scale from the fluid chamber.

The annular ledge of the seat ring has an annular groove therein which receives a sealing member having a free lip portion extending into the fluid chamber. The free lip portion contacts an opposed ledge of the conduit upon the travel or movement of the seat ring a predetermined amount after contact of the valve member with the seat ring thereby to provide an effective seal between the seat ring and the conduit in the closed position of the check valve member. The sealing member is effective only after contact of the seat ring by the valve member and movement of the seat ring to a retracted position, and the free lip portion being exposed to fluid from the high pressure side of the valve member has a sealing pressure proportional to the flowline pressure.

In the accompanying drawings, in which one of various possible embodiments of the invention is illustrated, FIG. 1 is a sectional view of the check valve structure comprising the present invention;

Figure 1:
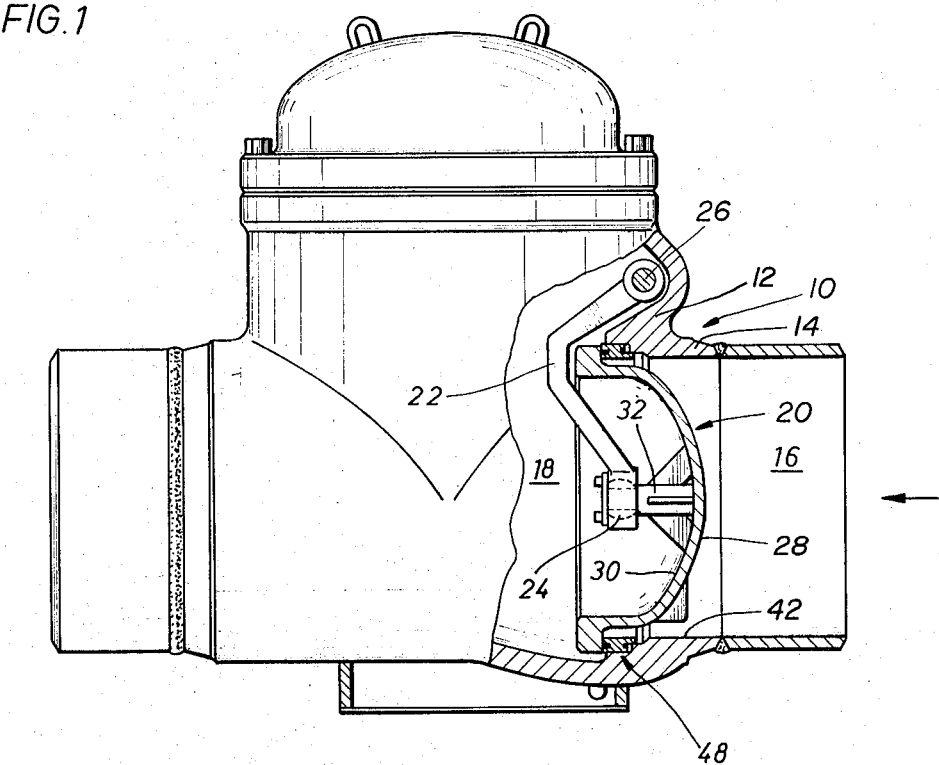

Referring now to the drawings for a better understanding of the invention, the valve structure comprising the present invention is generally indicated at 10 and includes a body 12 having a tubular conduit 14 which provides a flow passage 16. Body 12 has a chamber 18 therein which is adapted to receive the clapper-type valve member generally indicated 20. Clapper-type valve member 20 is mounted to an arm 22 about a ball and socket joint 24. Arm 22 is pivotally mounted at 26 and may, if desired, be driven by a suitable means (not shown) for opening and closing valve member 20. Valve member 20 is bowl-shaped having a convex outer surface 28 and a concave inner surface 30. An extension 32 is fixed to concave surface 30 for mounting valve member 20 about ball and socket joint 24. For further details of valve member 20, reference is made to co-pending application Ser. No. 400,454 filed Sept. 24, 1973.

The adjacent end 34 of conduit 14 is recessed to form an outer peripheral surface 36 having an annular groove 38 therein, an intermediate peripheral surface 40, and an inner peripheral surface 42 defining flow passage 16. An annular ledge 44 connects peripheral surfaces 36 and 40 and faces in a direction axially of flow passage 16. An inner beveled annular face 46 is provided between inner peripheral surface 42 and intermediate peripheral surface 40.

A seat ring generally indicated 48 fits within the recessed portions of conduit end 34 and has an outer peripheral surface 50 complementary to peripheral surface 36, an intermediate peripheral surface 52 and complementary to peripheral surface 40, and an inner peripheral surface 54 in alignment with inner peripheral surface 42 of conduit 14 and forming a continuation thereof. An annular ledge 56 connects surfaces 50 and 52 to form a back face spaced in opposed relation to annular ledge 44 to form a fluid chamber 58 therebetween. An end face 60 of seat ring 48 is spaced from annular face 46.

Ports 62 are spaced about the circumference of seat ring 48 and retainer screws 64 are received within groove 38 to retain seat ring 48 in position. Bores 66 are spaced along the circumference of annular ledge 56 and receive coil springs 68 therein. Coil springs 68 aid in maintaining seat ring 48 in an extended position when seat ring 48 is not in contact with valve member 20. As an example, a seat ring 48 of 48 inches in diameter may have 12 ports 62 and eight bores 66. The number of bores 66 and ports 62 would vary depending on the diameter of seat ring 48.

An annular groove 70 is provided in ledge 56. A sealing member generally indicated 72 has a base 74 secured within groove 70 and a flexible lip portion 76 extends from base 74. A pocket 78 is formed between lip portion 76 and base 74 and lip portion 76 is of a width less than the width of base 74 to easily fit within pocket 78 in the fully retracted position of seat ring 48. As an example, lip portion 76 may preferably project one-fourth inch beyond ledge 56 when ledge 56 is spaced from annular ledge 44 a distance of one-half inch. With this arrangement, seat ring 48 will have a travel of one-half inch and lip 76 will contact ledge 44 after an initial travel of one-fourth inch.

Seat member 48 has a front face 78 facing in a direction axially of flow passage 16 and a groove 80 therein receives a face seal 82 adapted to contact valve member 20 in a sealing relation upon contact of valve member 20 with seat ring 48. Seal 82 may be formed of a suitable material, such as polyfluoroethylene.

Outer peripheral surfaces 36 and 50 and intermediate peripheral surfaces 40 and 52 are spaced a predetermined distance from each other to provide adequate clearances for the flow or metering of fluid therebetween. The clearances which provide port means for the fluid in chamber 58 vary according to the diameter of seat ring 48. For example, with seat ring 48 being of a 48-inch diameter, an optimum clearance of around 0.020 inch is preferably provided between the complementary peripheral surfaces. A clearance between around 0.010 inch and 0.050 inch would function effectively. When seat ring 48 is in an extended position out of contact with valve member 20, flowline fluid enters fluid chamber 58 from the clearance between intermediate peripheral surfaces 40 and 52 and flows from chamber 58 through the clearance between outer peripheral surfaces 36 and 50. Thus, a continuous flow of flowline fluid through fluid chamber 58 is provided in the extended position of seat ring 48 thereby to provide a flushing action to remove foreign matter from fluid chamber 58.

In operation, valve member 20 upon initial contact with seat ring 48 contacts face seal 82 to provide a sealing relation therewith. The weight or impact of valve member 20 urges seat ring 48 in a rearward direction toward retracted position and such travel pressurizes the fluid in chamber 58 to force the fluid from chamber 58 through the clearances formed between outer complementary peripheral surfaces 36 and 50 and intermediate complementary peripheral surfaces 40 and 52. After seat ring 48 moves around one half of its total travel distance, free lip 76 of sealing member 72 contacts annular ledge 44 to provide a seal between seat ring 48 and tubular conduit 14. Lip portion 76 is exposed to high fluid pressure within the flowline and is urged by such high pressure tightly into engagement with ledge 44 thereby to provide an effective seal. Pocket 78 which is exposed to the high fluid pressure is filled by lip portion 76 upon movement of seat ring 48 its full travel distance with ledges 44 and 56 in close proximity to each other.

Figure 2:
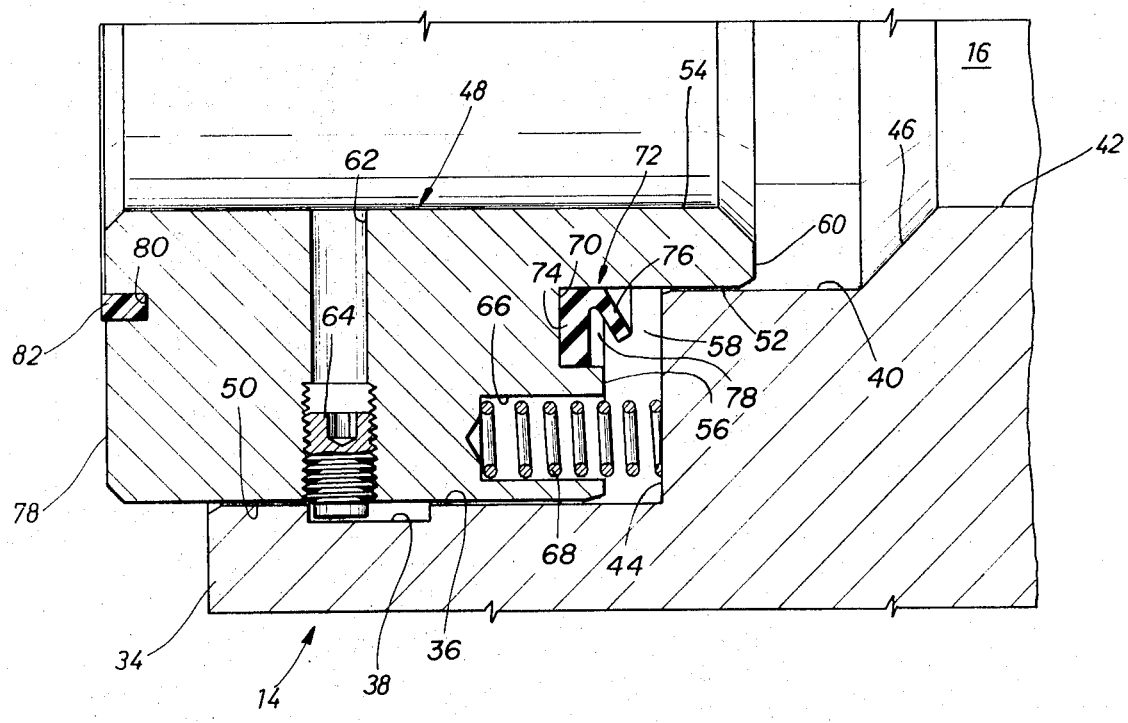
FIG. 2 is an enlarged fragment of FIG. 1 showing the seat and sealing means for the clapper-type valve member.
Figure 3:
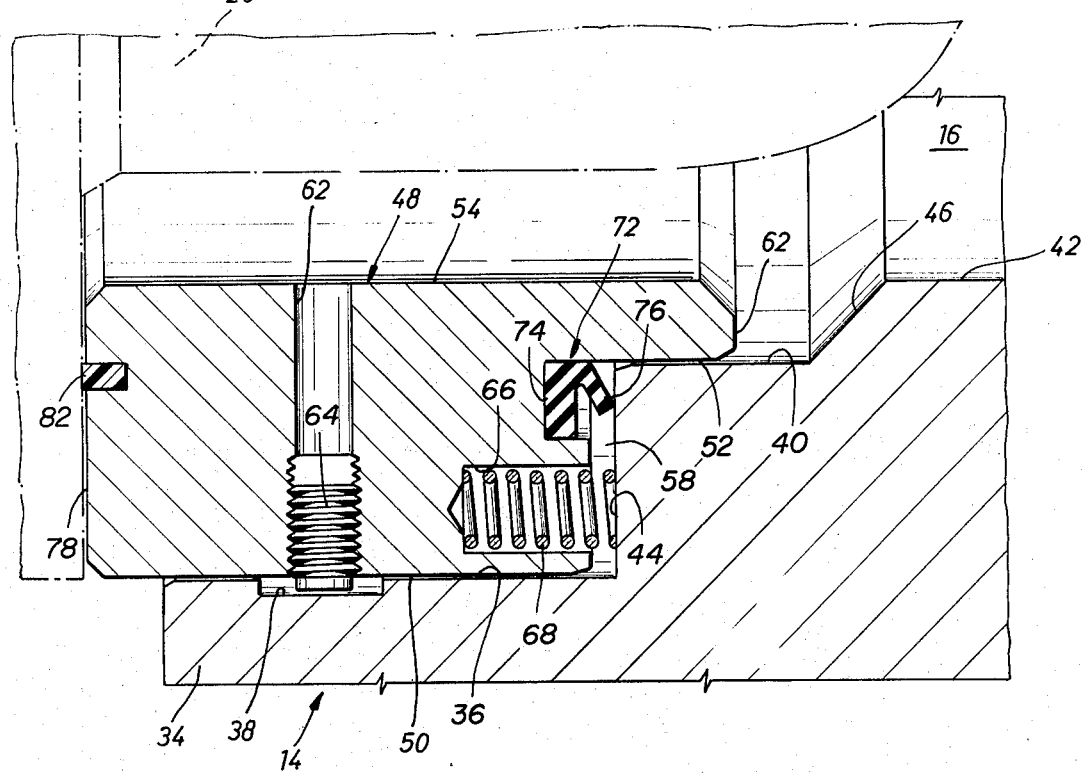
FIG. 3 is an enlarged section similar to FIG. 2 but showing the seat ring at an intermediate position in which the sealing member is in sealing relation to the valve body.
Figure 4:
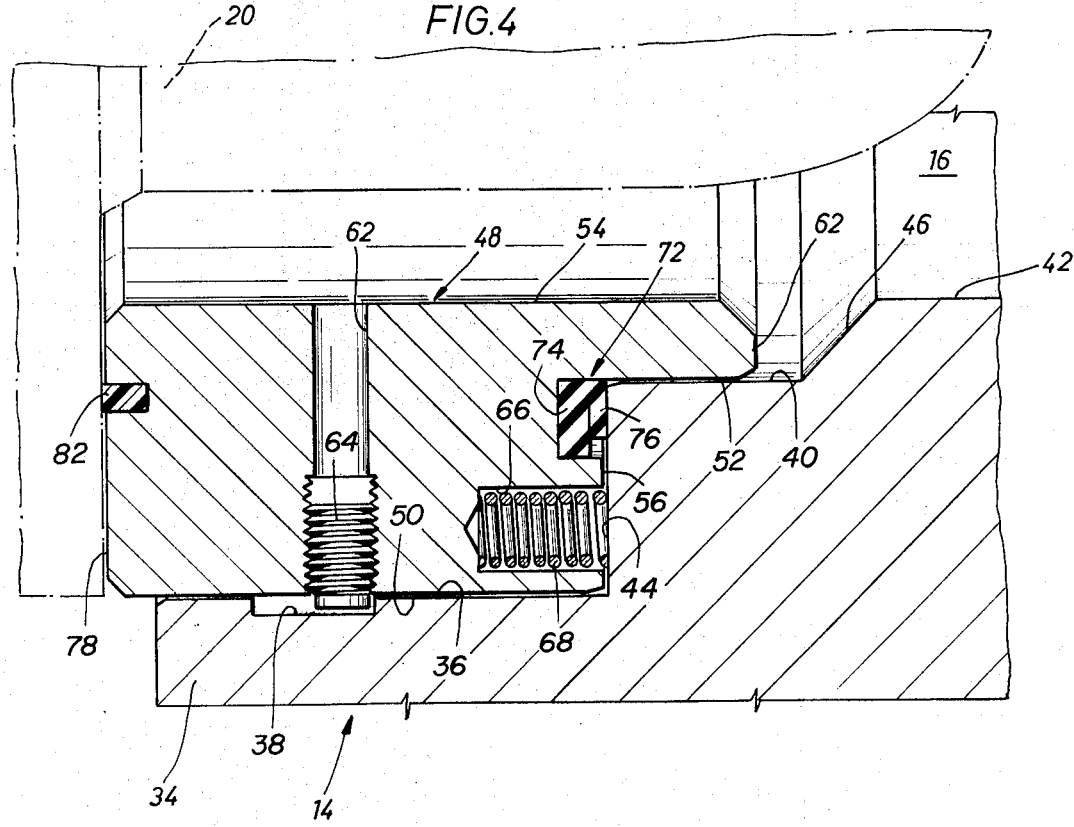
FIG. 4 is an enlarged section similar to FIG. 3 but showing the seat ring and sealing member in the full closed position of the seat ring.

Upon movement of valve member 20 away from contact with seat ring 48, coil spring members 68 along with fluid from the flowline return seat ring 48 to its original position in which retainer screws 64 are in engagement with an adjacent wall forming groove 38. Springs 68 being relatively light springs do not aid substantially in cushioning seat ring 48 upon contact of valve member 20 with seat ring 48 but are provided primarily to aid in return of seat ring 48 to the extended position shown in FIG. 2. FIG. 4 shows the full retracted position of seat ring 48 in which ledges 44 and 56 are closely spaced from each other. Thus, sealing member 72 effects a sealing relation between seat ring 48 and conduit 14 only upon travel of seat ring 48 about one half of its total travel distance.

What is claimed is:

1. A check valve structure comprising, a valve body having a conduit forming a flow passage with an end of the flow passage being recessed, a seat ring received within the recessed end of the conduit and mounted for movement axially of the conduit between an extended position and a retracted position, a clapper-type valve member mounted for swinging movement within the body and adapted to contact and seat on said seat ring when in a closed position, a fluid chamber formed between opposed facing surfaces on said seat ring and said recessed end, first port means permitting a limited flow of fluid between the fluid chamber and the flow passage from one end of the seat ring, second port means permitting a limited flow of fluid between the fluid chamber and the flow passage from an opposed end of the seat ring, and a seal on said facing surface of said seat ring extending into said fluid chamber and being in spaced relation to the adjacent facing surface of said recessed end in an open position of the clapper-type valve member to permit a flow of flowline fluid through the fluid chamber from said first and second port means in the open position of the valve member, said seal upon movement of the seat ring toward a retracted position contacting said facing surface of the recessed end and effecting a tight sealing relation between the body and the seat ring to prevent a flow of flowline fluid through the fluid chamber, said fluid being metered from the fluid chamber through said first and second port means upon movement of said seat ring to a retracted position from extended position for hydraulically cushioning such movement.

2. A check valve structure as set forth in claim 1 wherein said seat ring and said recessed end have facing outer peripheral surfaces spaced from each other a predetermined distance to define said first port means.

3. A check valve structure as set forth in claim 2 wherein said seat ring and said recessed end have facing intermediate peripheral surfaces of a lesser diameter than said outer peripheral surfaces and spaced from each other a predetermined distance to define said second port means.

4. A check valve structure as set forth in claim 1 wherein said opposed facing surface of said seat ring has an annular groove therein, said seal including a base mounted within said annular groove and a free lip portion extending from the base into said fluid chamber toward said opposed facing surface of said recessed end, said lip portion contacting said opposed facing surface of said recessed end only after movement of said seat ring toward a retracted position.

5. A check valve structure comprising, a valve body having a flow passage, a seat ring about the flow passage, a clapper-type valve member mounted for swinging movement within the body and adapted to contact and seat on said seat ring when in a closed position, said seat ring having an outer peripheral surface adjacent the valve member and an intermediate peripheral surface remote from the valve member, said valve body having outer and intermediate peripheral surfaces complementary to the outer and intermediate peripheral surfaces of said seat ring and spaced therefrom a predetermined amount to provide a clearance, said intermediate and outer peripheral surfaces of said seat ring being connected by an annular ledge facing in a direction axially of the flow passage, said intermediate and outer peripheral surfaces of said valve body being connected by a complementary annular ledge spaced from the annular ledge of the seat ring to form an annular fluid chamber therebetween, an annular groove in the annular ledge of the seat ring, and a seal mounted in said annular groove and spaced from the adjacent valve body annular ledge in an extended position of the seat ring but contacting said valve body annular ledge in a retracted position of the seat ring.

6. A check valve structure as set forth in claim 5 wherein said seal includes a base portion mounted in said annular groove and a free lip portion extending from the base into the fluid chamber toward the annular ledge of said body, said lip portion contacting said body annular ledge only after movement of said seat ring toward a retracted position.

7. A check valve structure as set forth in claim 6 wherein said free lip portion has a width less than the width of said base portion, and a pocket is formed between the free lip portion and the base portion in the extended position of the seat ring, said free lip portion in the retracted position of the seat ring fitting within the pocket.

* * * * *